United States Patent
Hirose et al.

(10) Patent No.: US 12,372,784 B2
(45) Date of Patent: Jul. 29, 2025

(54) HEAD-UP DISPLAY SYSTEM

(71) Applicant: Toray Industries, Inc., Tokyo (JP)

(72) Inventors: Shin Hirose, Otsu (JP); Takayuki Uto, Otsu (JP); Yuji Matsuo, Otsu (JP); Shohei Yoshida, Otsu (JP); Miyu Shiraishi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 388 days.

(21) Appl. No.: 18/024,077

(22) PCT Filed: Sep. 10, 2021

(86) PCT No.: PCT/JP2021/033289
§ 371 (c)(1),
(2) Date: Mar. 1, 2023

(87) PCT Pub. No.: WO2022/054902
PCT Pub. Date: Mar. 17, 2022

(65) Prior Publication Data
US 2023/0314800 A1    Oct. 5, 2023

(30) Foreign Application Priority Data

Sep. 14, 2020  (JP) .................................. 2020-153533
Sep. 30, 2020  (JP) .................................. 2020-164825
Jan. 28, 2021  (JP) .................................. 2021-011663

(51) Int. Cl.
*G02B 27/01*        (2006.01)
*B60K 35/00*        (2006.01)
(Continued)

(52) U.S. Cl.
CPC .......... *G02B 27/0101* (2013.01); *B60K 35/00* (2013.01); *C08J 5/124* (2013.01);
(Continued)

(58) Field of Classification Search
CPC ................. G02B 27/0101; G02B 1/11; G02B 2027/0118; G02B 27/01; B60K 35/00;
(Continued)

(56) References Cited

U.S. PATENT DOCUMENTS 7,123,418 B2    10/2006  Weber et al.
2014/0307176 A1  10/2014  Neuman et al.
(Continued)

FOREIGN PATENT DOCUMENTS

JP    2006512622 A    4/2006
JP    2019113631 A    7/2019
(Continued)

OTHER PUBLICATIONS

International Search Report and Written Opinion for International Application No. PCT/JP2021/033289, dated Oct. 19, 2021, 6 pages.

*Primary Examiner* — James C. Jones
(74) *Attorney, Agent, or Firm* — Buchanan Ingersoll & Rooney PC

(57) ABSTRACT

A head-up display (HUD) system is described that makes it less possible that coloring is visually recognized on a windshield even with sunglasses worn, wherein the head-up display system includes an image projector configured to project an image; and a resin film configured such that the image from the image projector is projected on the resin film, wherein the resin film is a reflective plane, and is disposed in such a manner that the incidence plane where the maximum of the absolute value of a* and the maximum of the absolute value of b* satisfy the following formulae (1) and (2) is at 90±10° to a horizontal plane.

Maximum of absolute value of $a^* \leq 30$      (1)

Maximum of absolute value of $b^* \leq 30$      (2)

21 Claims, 1 Drawing Sheet

(51) Int. Cl.
  *C08J 5/12*   (2006.01)
  *G02B 1/11*   (2015.01)
  *B60K 35/23*  (2024.01)

(52) U.S. Cl.
  CPC .............. *G02B 1/11* (2013.01); *B60K 35/23* (2024.01); *B60K 2360/23* (2024.01); *B60K 2360/334* (2024.01); *C08J 2367/02* (2013.01); *G02B 2027/0118* (2013.01)

(58) Field of Classification Search
  CPC .............. B60K 35/23; B60K 2360/23; B60K 2360/334; B60K 35/231; B60K 35/425; B60K 35/415; C08J 5/124; C08J 2367/02
  See application file for complete search history.

(56) References Cited

U.S. PATENT DOCUMENTS

2021/0138772 A1    5/2021   Uto et al.
2021/0341659 A1   11/2021   Matsui et al.

FOREIGN PATENT DOCUMENTS

| WO | 2018084076 A1 | 5/2018 |
| WO | 2019198635 A1 | 10/2019 |
| WO | 2020054529 A1 | 3/2020 |

HEAD-UP DISPLAY SYSTEM

CROSS REFERENCE TO RELATED APPLICATIONS

This application is the U.S. National Phase application of PCT/JP2021/033289, filed Sep. 10, 2021, which claims priority to Japanese Patent Application No. 2020-153533, filed Sep. 14, 2020, Japanese Patent Application No. 2020-164825, filed Sep. 30, 2020 and Japanese Patent Application No. 2021-011663, filed Jan. 28, 2021, the disclosures of these applications being incorporated herein by reference in their entireties for all purposes.

FIELD OF THE INVENTION

The present invention relates to a head-up display system.

BACKGROUND OF THE INVENTION

A head-up display (HUD) system is a display system configured to display information in the field of view of a passenger in a transportation machine, such as a vehicle, and, for example, display route information, attention attracting information, buildings information, and the like in accordance with the forward sight of the passenger, thereby enhancing the safety and comfort of driving. One of the simplest mechanisms is a system in which an image is projected obliquely from an image projector, and reflected on the projection section of a windshield in a transportation machine, resulting in a reflected image entering a passenger's field of view.

Patent Literature 1 describes, as such an example, a head-up display in which a reflective polarizer configured to reflect only polarized light radiated from an image projector is incorporated in a projection member. With a head-up display configured in such a manner, however, the reflective performance varies depending on the reflection axis of the reflective polarizer, and thus, the luminance of a displayed image becomes uneven in some of the cases in which an image is projected in a wide range on the projection section of a windshield. In addition, linearly polarized components that are in outside light and different in the direction of polarization by 90° with an image from the image projector are transmitted. Thus, a passenger wearing polarized sunglasses in a vehicle experiences a marked decrease in the visibility of either the displayed image or the outside light.

In addition, for example, a head-up display system including a reflective polarizer, a windshield formed by laminating a wave plate on the observer side of the reflective polarizer, and an image projector is disclosed in Patent Literature 2 as a means for inhibiting the luminance of a wide-ranging displayed image from becoming uneven, and in addition, securing the visibility of a displayed image and outside light with polarized sunglasses worn. A head-up display system including a reflective polarizer and a wave plate in combination is a mechanism by which the light projected from the image projector is changed to a circular polarized light or an elliptically polarized light at the wave plate, and by which the light of the image is reflected at the reflective polarizer. Thus, the system can reflect a displayed image with uniform luminance not only in the direction of the reflection axis of the reflective polarizer but also in a wide range. On the other hand, outside light is also transmitted through the reflective polarizer and the wave plate, and changed to a circular polarized light or an elliptically polarized light. Thus, the outside light is transmitted even through polarized sunglasses worn by an observer, and can be visually recognized by the observer.

PATENT LITERATURE

Patent Literature 1: JP2006-512622A
Patent Literature 2: JP2019-113631A

SUMMARY OF THE INVENTION

A head-up display system disclosed in Patent Literature 2 can maintain uniform reflective performance, and enables outside light to be visually recognized, even in a case in which an image is projected in a wide range on the projection section of a windshield. However, there is a problem in that a passenger who wears polarized sunglasses and visually recognizes the outside light changed to a circular polarized light and an elliptically polarized light will undesirably recognize rainbow-like coloring visually on a windshield, and thus that the passenger's field of vision is worsened.

In view of this, the present invention is to solve the above-mentioned problems. An object of the present invention is to provide a head-up display system that maintains uniform reflective performance, and makes it less possible even for a wearer of polarized sunglasses to visually recognize coloring on a windshield, even in a case in which an image is projected in a wide range on the windshield as above-mentioned.

The present invention is to solve the above-mentioned problems, and composed of the following constituents. That is, a head-up display system including: an image projector configured to project an image; and a resin film configured such that the image from the image projector is projected on the resin film;

wherein, in a light constituting the image from the image projector, the intensity of a p-polarized light component with respect to an incidence plane is 51% or more of the intensity of all the light components, assuming that the resin film is a reflective plane.

wherein the resin film is disposed in such a manner that the incidence plane where the maximum of the absolute value of $a^*$ and the maximum of the absolute value of $b^*$ determined by the following measurement method satisfy the following formulae (1) and (2) is at 90±10° to a horizontal plane.

$$\text{Maximum of absolute value of } a^* \leq 30 \quad (1)$$

$$\text{Maximum of absolute value of } b^* \leq 30 \quad (2)$$

<Measurement Method>

To a spectrophotometer (U-4100 Spectrophotometer) manufactured by Hitachi, Ltd., a variable-angle unit accessory thereto and a polarizer manufactured by Glan-Taylor are attached. A polarized light is radiated at an incident angle of each of 40°, 60°, and 80° to the film, the polarized light being to result in an s-polarized light with respect to an incidence plane with the resin film assumed as a reflective plane. Furthermore, a light transmitted through the resin film is transmitted through the polarizer the absorption axis of which is the s-polarized light. The transmittance in the wavelength range of from 400 to 1600 nm is measured at each incident angle. Here, the slit is set at 2 nm (visible)/automatically controlled (infrared), the gain is set at 2, and the scanning rate is set at 600 nm/minute. The transmittance spectrum obtained, the spectral distribution of the D65 light source, and the color matching function of the XYZ system are used to calculate the absolute value of a* and the maximum value thereof and the absolute value of b* and the maximum value thereof at each incident angle.

In this regard, the incidence plane which satisfies the above-mentioned formula (1) and formula (2) can be examined by making the same measurement with the resin film rotated about the point at which the light reaches the film.

The present invention makes it possible to obtain a head-up display system that maintains uniform reflective performance, and makes it less possible even for a wearer of polarized sunglasses to visually recognize coloring on a windshield, even in a case in which an image is projected in a wide range on a windshield.

DETAILED DESCRIPTION OF EMBODIMENTS OF THE INVENTION

Figure 1:
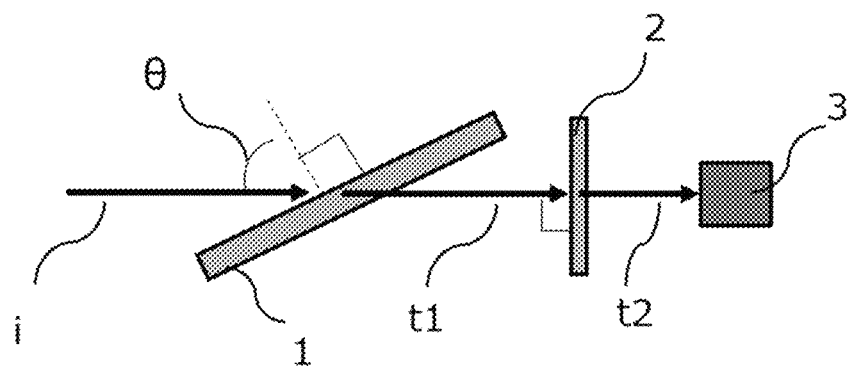
FIG. 1 is a schematic diagram for describing a method of measuring a transmittance in a first measurement method.

A head-up display system according to the present invention will now be described specifically. The present invention should not be construed to be limited to the embodiments including the below-mentioned Examples. Various modifications are obviously encompassed in the scope of the present invention to the extent that such modifications can achieve an object of the invention, and do not depart from the spirit of the invention. In addition, a head-up display is hereinafter referred to as an HUD in some cases.

It is important that an HUD system according to the present invention include: an image projector configured to project an image; and a resin film configured such that the image from the image projector is projected on the resin film. In addition, it is important that, in a light constituting the image from the image projector, the intensity of a p-polarized light component with respect to an incidence plane is 51% or more of the intensity of all the light components, assuming that the resin film is a reflective plane. Here, the p-polarized light refers to an electromagnetic wave the electric field component of which is parallel to an incidence plane (linearly polarized light oscillating parallel to the incidence plane), and the s-polarized light refers to an electromagnetic wave the electric field component of which is normal to the incidence plane (linearly polarized light oscillating normally to the incidence plane). That the light constituting an image projected from an image projector contains a large amount of a p-polarized light component is important from the viewpoint of inhibiting the generation of multiple images, that is, displayed images that look multiple, in which such multiple images are generated by a deviation in the route between the light beams reflected on the respective faces on the front side and back side of a projection section (information display section) of a windshield in a transportation machine.

In a case in which the light constituting an image projected from an image projector contains an s-polarized light, the light is reflected on the front face and back face of a member constituting an information display section, and thus, causes visually recognizable multiple images. However, in a case in which a p-polarized light is made incident at an incident angle equal to or near Brewster's angle, the light is hardly reflected on the front face and back face of the information display section. In addition, allowing the light constituting an image projected from an image projector to contain a large amount of a p-polarized light makes it possible to inhibit a decrease in the luminance of a displayed image seen even with polarized sunglasses worn. Polarized sunglasses are designed to block the s-polarized light component in order to inhibit the reflection on the ground surface and the glare of a windshield, and acquire a clear field of vision, in which such reflection and glare are mostly composed of the s-polarized light component, assuming that the ground surface and the water surface are each a reflective plane. Hence, allowing the light constituting an image projected from an image projector to contain a large amount of a p-polarized light different in the direction of polarization by 90° makes it possible to maintain the luminance of a displayed image seen even with polarized sunglasses worn. From such a viewpoint, the higher the ratio of the p-polarized light component in the light projected by the image projector, the better. The ratio is more preferably 90% or more, still more preferably 99% or more. In this regard, for the above-mentioned reason, the upper limit of the ratio of the p-polarized light component in the light radiated from the projection light source is substantially, but not limited particularly to, 100%.

It is important that the resin film is disposed in such a manner that the incidence plane where the maximum of the absolute value of a* and the maximum of the absolute value of b* determined by the following measurement method satisfy the following formulae (1) and (2) is at 90°±10° to a horizontal plane.

$$\text{Maximum of absolute value of } a* \leq 30 \tag{1}$$

$$\text{Maximum of absolute value of } b* \leq 30 \tag{2}$$

<Measurement Method> (this Measurement Method is Referred to as a "First Measurement Method")

To a spectrophotometer (U-4100 Spectrophotometer) manufactured by Hitachi, Ltd., a variable-angle unit accessory thereto and a polarizer manufactured by Glan-Taylor are attached. A polarized light is radiated at an incident angle of each of 40°, 60°, and 80° to the film, the polarized light being to result in an s-polarized light with respect to an incidence plane with the resin film assumed as a reflective plane. Furthermore, a light transmitted through the resin film is transmitted through the polarizer the absorption axis of which is the s-polarized light. The transmittance in the wavelength range of from 400 to 1600 nm is measured at each incident angle. Here, the slit is set at 2 nm (visible)/automatically controlled (infrared), the gain is set at 2, and the scanning rate is set at 600 nm/minute. The transmittance spectrum obtained, the spectral distribution of the D65 light source, and the color matching function of the XYZ system are used to calculate the absolute value of a* and the maximum value thereof and the absolute value of b* and the maximum value thereof at each incident angle.

In this regard, the incidence plane which satisfies the above-mentioned formula (1) and formula (2) can be examined by making the same measurement with the resin film rotated about the point at which the light reaches the film.

In this connection, the s-polarized light in the above-mentioned measurement method is based on assuming not an HUD-projected light as the p-polarized light radiated from the light source, but a light entering from an outside scene, as the below-mentioned. In addition, the incident angle refers to an angle between a line normal to the face of the resin film and a light made incident on the resin film.

FIG. 1 is a diagram for describing a measurement of a transmittance by the above-mentioned first measurement method. First, a polarized light (incident light i) is radiated at an incident angle θ to a resin film 1, the polarized light being to result in an s-polarized light with respect to an incidence plane with the resin film assumed as a reflective plane. A transmitted light t1 is thus obtained. Subsequently, the transmittance (T(θ,λ)) of a transmitted light t2 obtained from the transmitted light t1 transmitted through a polarizer 2 at an incident angle of 0° is obtained by a detector 3 at each wavelength λ. In this regard, disposing the resin film 1 and the polarizer 2 in such an aspect is modeled on an aspect in which an outside scene is visually recognized with common polarized sunglasses worn. As above-mentioned, a light from an outside scene is mostly composed of the s-polarized light component, assuming that the ground surface or the water surface is assumed as a reflective plane. Polarized sunglasses are designed to block the s-polarized light component in order to secure a clear field of vision.

In addition, the chromaticity, a*,b*, refer to a chromaticity obtained using the following: a transmittance T(θ,λ) obtained at an incident angle θ at each wavelength λ; the spectral distribution of the D65 light source; and the color matching function in the XYZ system. With this chromaticity, a presents a more reddish tinge when more positive, and presents a more greenish tinge when more negative. In addition, b* presents a more yellowish tinge when more positive, and presents a more blueish tinge when more negative. In the case in which a* and b* are both 0, the chromaticity presents an achromatic color.

The absolute values of a* and b* at incident angles θ of 40°, 60°, and 80° are calculated, and the maximum thereof is determined. Achieving 30 or less as both the maximum of the absolute value of the chromaticity a* and the maximum of the absolute value of the chromaticity b* at these incident angles makes it less possible that coloring is visually recognized on a windshield with polarized sunglasses worn. The values preferable as these maximums are both 22 or less, still more preferably both 20 or less, particularly preferably both 10 or less. Achieving 10 or less as both maximums prevents coloring from being visually recognized on a windshield with polarized sunglasses worn, and makes it possible to provide a transparent and favorable field of vision.

For an HUD system according to the present invention, it is important to have an arrangement such that, when the absolute values of a* and b* are calculated at the incident angles θ of 40°, 60°, and 80°, an incidence plane that satisfies 30 or less as both of the maximums of the values is at 90±10° to a horizontal plane. In such a manner, the incidence plane being at 90° to a horizontal plane makes it possible that a driver visually will not recognize coloring even when visually recognizing an outside scene with polarized sunglasses, as above-mentioned. Furthermore, the incidence plane being at 90°±10° to a horizontal plane makes it less possible for a driver wearing polarized sunglasses to visually recognize coloring on a windshield, even when the driver changes her/his posture or tilts her/his neck. In a method in which the absolute values of a* and b* are calculated at the incident angles θ of 40°, 60°, and 80°, and in which an incidence plane that satisfies 30 or less as both of the maximums of the values is determined, such an incidence plane can be determined by making the same measurement with the resin film being rotated about a point at which a light reaches the film.

In a method of decreasing the absolute values of a* and b* at an incident angle θ, a multilayer film having at least two resin layers laminated and having different optical properties in the form of a resin film is used. As at least one of the thermoplastic resins that are each a main component of each of the layers constituting the multilayer film, a resin having birefringence is used. The laminate is uniaxially stretched, or biaxially stretched at a stretch ratio made higher in one of the directions, and the direction in which the stretch ratio is higher is disposed as the direction normal to the above-mentioned incidence plane. Thus, the absolute values can be decreased. Here, with reference to the biaxial stretching direction, the direction in which the stretch ratio is higher is referred to as a higher-ratio direction, and the direction in which the stretch ratio is lower is referred to as a lower-ratio direction. In a method of further decreasing the absolute values of a and b* at an incident angle θ, the absolute values of a* and b* can be further decreased by further increasing the stretch ratio in the higher-ratio direction, or by further decreasing the stretch ratio in the lower-ratio direction, and increasing the difference in the ratio between the higher-ratio direction and lower-ratio direction. More specifically, the difference in the ratio between the higher-ratio stretch direction and the lower-ratio stretch direction is preferably 0.5 time or more. The difference in the ratio is more preferably 0.8 time or more, still more preferably 1.0 time or more. In addition, the range of the incident angle of from 40° to 80°, as used herein, refers to an angle corresponding to the mounting angle of a windshield in a common HUD system. In a case in which a light radiated at an incident angle of 40° to 80° is transmitted through a windshield, and in which coloring on a windshield is not seen with polarized sunglasses worn, such an HUD system can be mounted for various kinds of windshields. In this regard, the higher-ratio direction of the resin film is examined by measuring the orientation axis of the resin film in the below-mentioned measurement method (1).

To alleviate the visual recognition of coloring on a windshield, it is preferable for an HUD system according to the present invention that the smallest value of N(40), N(60), and N(80) is 4 or more, when the transmittance at the incident angle θ and at a wavelength of λ nm is T(θ,λ) (%), the average value of the T(θ,λ) in the wavelength range for from 450 nm to 750 nm is C(θ) (%), and the number of λs that satisfy T(θ,λ)=C(θ) is N(θ), in which all these are obtained in the first measurement method.

Figure 2:
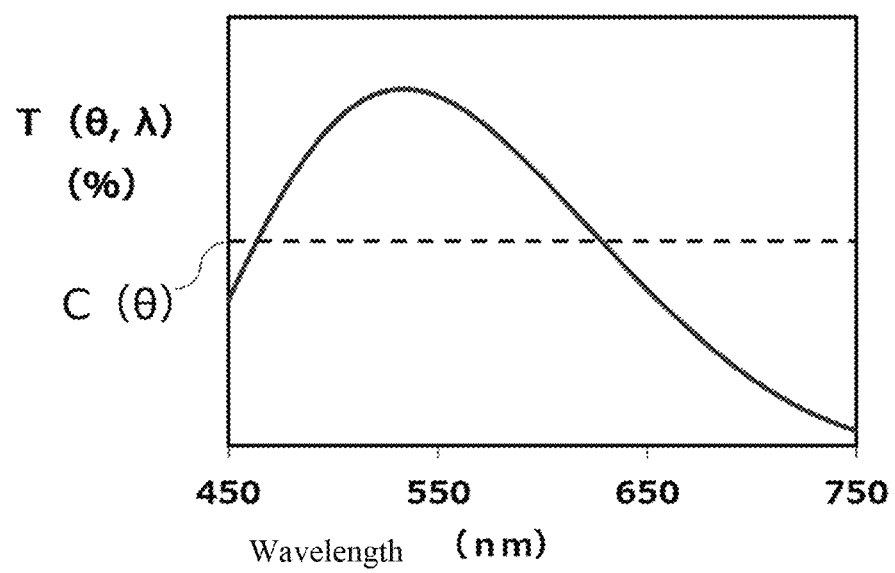
FIG. 2 is an example of a graph illustrating a transmittance $T(\theta,\lambda)(\%)$ at an incident angle $\theta$ and the average value $C(\theta)(\%)$ of the $T(\theta,\lambda)$ in the wavelength range of from 450 nm to 750 nm.

FIG. 2 affords an example of a graph illustrating transmittance T(θ,λ) and the average value C(θ) of the T(θ,λ) in the wavelength range of from 450 nm to 750 nm. N(θ) corresponds to the number of wavelengths that each separate a band of wavelengths consecutively higher than C(θ) and a band of wavelengths consecutively lower than C(θ) in the transmittance T(θ,λ). In the example of a graph of transmittance T(θ,λ) in FIG. 2, N(θ)=2, and there is one band of wavelengths higher than C(θ) in T(θ,λ) in the wavelength range of from 450 nm to 750 nm. Accordingly, a passenger wearing polarized sunglasses visually and strongly recognizes the color of the light in the band of wavelengths. Here, as the number of bands of wavelengths at which T(θ,λ) is higher than C(θ) increases along with an increase in N(θ), the color that is visually recognized is a mixture of colors of lights in the bands of wavelengths. However, if N(θ) is 4 or more, the color of lights in the band of wavelengths at which T(θ,λ) is higher than C(θ) increases, and the color to be visually recognized results in an achromatic color. Thus, a passenger wearing polarized sunglasses is less prone to visually recognize coloring on a windshield. From the above-mentioned viewpoint, N(θ) is more preferably 5 or more, and N(θ) is still more preferably 6 or more. On the other hand, N(θ) has no upper limit, but from the viewpoint of feasibility, N(θ) is preferably 8 or less.

As above-mentioned, the range of incident angles of from 40° to 80° described here correspond to angles based on assuming an angle at which a windshield for a commonly HUD system is mounted. The smallest value of 4 or more among N(40), N(60), and N(80) enable an HUD system to be mounted for various kinds of windshields. A method of increasing N(θ) can be achieved by the following: a method in which a resin having birefringence is used for at least one of two kinds of resin layers that constitute the multilayer structure of a resin film, which is uniaxially stretched or biaxially stretched with an enlarged difference in the stretch ratio; and a method in which the direction in which the stretch ratio is higher (the stretch direction in the case of uniaxial stretching) is arranged in the direction normal to an incidence plane of a projection light source; or the like. In a case in which biaxial stretching is performed, the difference in the ratio between the higher-ratio stretch direction and the lower-ratio stretch direction is preferably 0.5 time or more. The difference in the ratio is more preferably 0.8 time or more, still more preferably 1 time or more.

For an HUD system according to the present invention, N(40), N(60), and N(80) preferably satisfy the relational formula, N(40)≤N(60)≤N(80). Satisfying this relational formula makes it less possible that coloring on a windshield is visually recognized with polarized sunglasses worn. Examples of a means that can be used to achieve the satisfaction of the relational formula, N(40)≤N(60)≤N(80), include the same method as the method of increasing N(θ). On the other hand, when the relational formula, N(40)≤N(60)≤N(80), is not satisfied, the value of each of N(40), N(60), and N(80) can be smaller than when this relational formula is satisfied, and coloring can be visually recognized depending on the incident angle.

The resin film desirably satisfies the relationship, Rp20≤Rp40<Rp70, assuming that the reflectance (%) of a light made incident at an incident angle of each of 20°, 40°, and 70° on the resin film is Rp20, Rp40, and Rp70 respectively, the light being to result in a p-polarized light with respect to an incidence plane with the face of the resin film assumed as a reflective plane. In this regard, conforming the incidence plane to the incidence plane of the light constituting an image from an image projector and entering the face of the resin film is suited to evaluate the visibility of information.

In an HUD system according to the present invention, the resin film preferably satisfies the relationship, Rp20≤Rp40<Rp70, assuming that the reflectance (%) of a light made incident at an incident angle of each of 20°, 40°, and 70° on the resin film is Rp20, Rp40, and Rp70 respectively, the light being to result in a p-polarized light with respect to an incidence plane with the face of the resin film assumed as a reflective plane. As used herein, the reflectance is the average reflectance of lights in the wavelength range of from 450 nm to 650 nm. In a case in which a base plate is constituted by a common transparent material, such as glass or a transparent film, and in which the incident angle is gradually increased from 20° to a line normal to the face of the base plate, the reflectance of a p-polarized light, which is one of the polarized lights, is decreased accordingly, and the reflectance reaches the minimum at an angle called Brewster's angle. Accordingly, in a case in which an image is projected to a resin film at an incident angle equal to or near Brewster's angle, the reflectance is low, thus making the visibility of the displayed image very bad. Thus, in a case in which the resin film satisfies the relationship, Rp20≤Rp40<Rp70, assuming that the reflectance (%) of a light made incident at an incident angle of each of 20°, 40°, and 70° on the resin film is Rp20, Rp40, and Rp70 respectively, the light being to result in a p-polarized light with respect to an incidence plane with the face of the resin film assumed as a reflective plane, there is no angle corresponding to Brewster's angle, and thus, a displayed image of an image projected obliquely can be visually recognized sharply. A method that can be used to obtain such a resin film is to make the structure multi-layered as below-mentioned, in which a difference in the refractive index between two thermoplastic resins is small in the direction parallel to the face of the film, and a difference in the refractive index is large in the direction normal to the face of the film.

In an HUD system according to the present invention, the resin film preferably achieves an average reflectance of 10% or more when a light is radiated at an incident angle of 60° to the resin film, the light being to result in a p-polarized light with respect to an incidence plane with the face of the resin film assumed as a reflective plane, and simultaneously, the face of the film is rotated in an in-plane manner in the range of from 0 to 90° about the point irradiated. Here, "an average reflectance when the face of the film is rotated in an in-plane manner in the range of from 0 to 90° about the point irradiated" can be measured as the average of the values of reflectance at the wavelengths in the band of wavelength from 450 nm to 650 nm when the resin film is rotated in an in-plane manner at 5°-intervals from 0 to 90° about the orientation axis of the resin film.

That this average reflectance is 10% or more means that a constant reflective performance can be maintained in a range in which an image is projected, and a displayed image being less uneven and having a high luminance can be displayed, even in a case in which the image is projected in a wide range on a windshield in a transportation machine, using an HUD system according to the present invention. On the other hand, in some of the cases in which this average reflectance is less than 10%, and in which an image is projected in a wide range on a windshield, such unevenness of luminance as to affect the visibility is caused in part of the displayed image in the range of projection. For example, a head-up display described in Patent Literature 1 includes a reflective polarizer. If the direction of the reflection axis of the reflective polarizer is not conformed to the incidence plane direction of projection, the oblique-reflectance rate of the incident light is decreased. Accordingly, in a case in which an image is projected in a wide range on a windshield in a head-up display described in Patent Literature 1, the incidence plane of a projected light source does not conform to the reflection axis of the reflective polarizer somewhere in the range of projection, causing a concern about a decrease in the visibility of the displayed image. Furthermore, from the viewpoint of the angle-of-direction dependency of the reflection axis of reflective polarizer, the position of an image projector to be mounted is restricted.

From the above-mentioned viewpoint, this average reflectance is more preferably 30% or more, still more preferably 50% or more, particularly preferably 60% or more. In addition, this average reflectance being higher makes it possible to obtain a displayed image having a higher luminance when the image is projected in a wide range on a windshield, but, on the other hand, decreases the visibility of outside information via a windshield. Thus, the upper limit value is 90%. In this regard, the average reflectance in the case in which a p-polarized light is radiated at an incident angle of 60° to the face of the resin film, and in which the resin film is rotated in an in-plane manner in the range of from 0 to 90° about the point of radiation can be measured using a spectrophotometer including a variable-angle unit and a polarizer, examples of which spectrophotometer include a spectrophotometer (U-4100 Spectrophotometer) manufactured by Hitachi, Ltd.

Using the following procedures, a measurement can be made of an average reflectance given when a light is radiated at an incident angle of 60° to a resin film, the light being to result in a p-polarized light with respect to an incidence plane with the face of the resin film assumed as a reflective plane, and simultaneously, the face of the film is rotated in an in-plane manner in the range of from 0 to 90° about the point irradiated. First, a p-polarized light is radiated at an incident angle of 60° to a resin film the orientation axis of which is disposed parallel to the incidence plane. A reflection spectrum is measured in the wavelength range of from 400 to 1600 nm, and from the reflection spectrum obtained, the average of the reflectance values in the wavelength range of from 450 to 650 nm is determined. Then, the same measurement is made with the resin film being rotated in an in-plane manner at 5°-intervals clockwise about the orientation axis. This is repeated until the rotation angle in total reaches 90°. The average values of the reflectance values thus obtained at the angles are added up and averaged. The resulting value is regarded as an average reflectance (%) obtained when the resin film is rotated in an in-plane manner in the range of from 0 to 90° about the orientation axis.

Examples of a method of bringing the average reflectance to 10% or more or within the above-mentioned preferable range in the case in which a light is radiated at an incident angle of 60° to a resin film, the light being to result in a p-polarized light with respect to an incidence plane with the face of a resin film assumed as a reflective plane, and simultaneously, the face film is rotated in an in-plane manner in the range of from 0 to 90° about the point of radiation include: a method in which preferable components are used as the components of the resin constituting the resin film; a method in which the structure of the resin film is a preferable multilayer structure; a method in which the stretching conditions, such as a stretching method, a stretching rate, a stretch ratio, and a stretching temperature, are brought within preferable ranges when the resin film is produced through stretching processes; and a method in which a resin film is collected from a roll-shaped film produced and in a predetermined width range.

More specifically, the resin film is preferably constituted by two different kinds of polyester resin layers that have different main components and are alternately laminated. In particular, it is preferable that one of the two kinds of polyester resins is a crystalline polyester, and that the other is an amorphous polyester. As a stretching method, simultaneous biaxial stretching is more preferable than sequential biaxial stretching. From the viewpoint of productivity, in a case in which sequential biaxial stretching is used, the stretching rate in the longitudinal direction is preferably made lower to the extent that the planarity is not decreased. An adjustment is preferably made in such a manner that the stretch ratio in the width direction is higher than the stretch ratio in the longitudinal direction, but not too high. The stretching temperature is preferably in the range between the following: the glass transition temperature of a resin having a high glass transition temperature among the polyester resins contained as the main components of the layers; and the glass transition temperature of the resin+100° C. Furthermore, when a heat treatment is performed after the stretching, it is also preferable that additional stretching is performed in the width direction in the first half of the heat treatment, and/or that a relaxation treatment is performed in the second half of the heat treatment.

A resin film included in an HUD system according to the present invention preferably contains a polyester resin as a main component. As used herein, a polyester resin refers to a polycondensate synthesized by forming an ester bond through dehydration condensation between a dicarboxylic acid and a diol. The phrase "contains a polyester resin as a main component" means that the resin film contains a polyester resin at more than 50 mass % and 100 mass % or less in total. A polyester resin included in the resin film is subject to no particular limitation as long as the polyester resin does not impair the effects of the present invention. Among others, a preferable main component of such a resin is a polyester obtained by polymerization of monomers the main components of which are an aromatic dicarboxylic acid or an aliphatic dicarboxylic acid and a diol. In this regard, "the main components of which are an aromatic dicarboxylic acid or aliphatic dicarboxylic acid" refers to containing an aromatic dicarboxylic acid unit or an aliphatic dicarboxylic acid unit at 80 mol % or more and 100 mol % or less with respect to 100 mol % of the total dicarboxylic acid units included in the polyester resin.

Here, examples of the aromatic dicarboxylic acid include terephthalic acid, isophthalic acid, phthalic acid, 1,4-naphthalenedicarboxylic acid, 1,5-naphthalenedicarboxylic acid, 2,6-naphthalenedicarboxylic acid, 4,4'-diphenyldicarboxylic acid, 4,4'-diphenyletherdicarboxylic acid, 4,4'-diphenylsulfonedicarboxylic acid, and the like. Examples of the aliphatic dicarboxylic acid include adipic acid, suberic acid, sebacic acid, dimer acid, dodecanedioic acid, cyclohexane dicarboxylic acid, ester derivatives thereof, and the like. Among these, terephthalic acid, isophthalic acid, and 2,6-naphthalenedicarboxylic acid are particularly preferable. These acid components may be used singly, or may be used in combination of two or more kinds thereof.

In addition, examples of the diol component include ethylene glycol, paraxylene glycol, 1,2-propanediol, 1,3-propanediol, neopentyl glycol, 1,3-butanediol, 1,4-butanediol, 1,5-pentanediol, 1,6-hexanediol, 1,2-cyclohexane dimethanol, 1,3-cyclohexane dimethanol, 1,4-cyclohexane dimethanol, diethylene glycol, triethylene glycol, polyalkylene glycol, 2,2-bis(4-hydroxyethoxyphenyl) propane, isosorbate, spiroglycol, bisphenoxyethanolfluorene (BPEF), and the like. Among these, ethylene glycol, polyalkylene glycol, and paraxylene glycol are particularly preferable. These diol components may be used singly, or may be used in combination of two or more kinds thereof.

A resin film included in an HUD system according to the present invention is preferably formed by alternately laminating two different kinds of polyester resin layers that are among the above-mentioned polyester resins and have different main components. In particular, it is preferable that one of the two kinds of polyester resins is a crystalline polyester, and that the other is an amorphous polyester. As used herein, an amorphous resin refers to a resin that is as follows: in accordance with JIS K 7122 (1999), the resin is heated from a temperature of 25° C. to 300° C. at a heating rate of 20° C./minute at a heating rate of 20° C./minute (a 1st RUN), held for 5 minutes as it is, then cooled to a temperature of 25° C. or less at 30° C./minute, and again heated from room temperature to a temperature of 300° C. at a heating rate of 20° C./minute in a 2nd RUN, providing a chart of differential scanning calorimetry, in which chart, the crystal melting calorie ΔHm is 5 J/g or less, as determined from the peak area of the melting peak. The amorphous polyester is preferably constituted by three or more kinds of copolymerization components, and still more preferably contains, as copolymerization components, the following: a polycyclic aromatic compound, such as naphthalene or anthracene; and a polyalkylene glycol having a number-average molecular weight of 200 or more.

A resin film included in an HUD system according to the present invention can be produced by laminating the resins, for example, using the below-mentioned method. First, two kinds of thermoplastic resins are made ready for use in a form such as pellets. If needed, the pellets are dried with hot air or under vacuum, and then supplied into separate extruders. In an extruder, the thermoplastic resin is heat-melted at a temperature equal to or higher than the melting point. The resin is extruded with the amount of extrusion uniformized by a gear pump or the like. Foreign matter, degraded resin, and the like are removed through a filter or the like. Next, the two kinds of thermoplastic resins are fed into a multi-layer laminating apparatus through separate flow paths, and laminated alternately. Examples of the multi-layer laminating apparatus that can be used include a multi-manifold die, a feedblock, a static mixer, and the like. In particular, a feedblock having 50 or more microslits is preferably used. Using such a feedblock does not cause the apparatus to be extremely large, and thus, allows the amount of foreign matter due to thermal degradation to be small, making it possible to laminate layers with high accuracy even in a case in which the number of the layers to be laminated is extremely large. In addition, the accuracy of lamination in the width direction is markedly enhanced, compared with a conventional technology. In addition, such an apparatus makes it possible to adjust the thickness of each layer in accordance with the shape (length and width) of the slit, and thus makes it easy to achieve an arbitrary thickness of the layer.

Next, the molten resin laminated is molded into sheet form through a mouth piece, extruded onto a cooling device, such as a casting drum, and thereby cooled to be solidified, whereby a cast film is obtained. When this is done, it is preferable that an electrode, such as in the form of a wire, tape, needle, knife, or the like, is used so that the molten resin in sheet form can be closely attached to the cooling device, such as a casting drum, by electrostatic force, and thus rapidly cooled to be solidified.

The cast film thus obtained is preferably biaxially stretched. As used herein, biaxial stretching refers to stretching in the longitudinal direction and in the width direction. The longitudinal direction is the direction in which the film is run, and the width direction is the direction perpendicular to the longitudinal direction in the plane of the film. Stretching may be stretching in two directions sequentially (sequential biaxial stretching), or may be stretching in two directions simultaneously (simultaneous biaxial stretching). In addition, additional stretching may be performed in the longitudinal direction and/or in the width direction.

In the case of simultaneous biaxial stretching, the stretching rate is preferably 5 to 80%/second, more preferably 10 to 50%/second, to enhance the visibility of the HUD system. Simultaneous biaxial stretching is usually performed using a tenter, in which the film is conveyed with both ends held with clips. The stretch ratio is preferably 2 to 5 times both in the longitudinal direction and in the width direction. The stretching temperature is preferably between the following: the glass transition temperature of a resin having a high glass transition temperature among the polyester resins contained as the main components of the layers constituting the cast film to be stretched; and the glass transition temperature of the resin+100° C.

The film thus biaxially stretched is preferably heat-treated in the tenter in the range between the following temperatures: the stretching temperature+100° C.; and the stretching temperature+150° C. When this is done, relaxation is preferably performed in the longitudinal direction and in the width direction at a relaxing rate of 0.01 to 2%/second. The ratio of relaxation is preferably 0.90 time to 0.99 time with respect to the width of the film immediately before relaxation. The resin film thus obtained is then uniformly and slowly cooled to room temperature. Then, the edge portions held with clips at both ends in the tenter are cut, and the resin film is wound up.

In the case of sequential biaxial stretching, the stretching rate in the longitudinal direction is preferably 50 to 300%/second, more preferably 70 to 150%/second, to enhance the visibility of the HUD system. The stretching in the longitudinal direction is usually performed with a difference in the circumferential speed between rolls, and the stretch ratio is preferably 1.5 to 5 times. The stretching temperature is preferably between the following: the average glass transition temperature of two kinds of resins constituting a cast film to be stretched; and the average glass transition temperature+100° C. Subsequently, the uniaxially stretched film obtained by stretching in the longitudinal direction is preferably stretched in the width direction at a stretching rate of 5 to 40%/second, more preferably 8 to 30%/second. The stretching in the width direction is usually performed using a tenter, in which the film is conveyed with both ends held with clips. The stretch ratio is preferably 1.5 to 6.5 times.

A difference in the stretch ratio between the longitudinal direction of the film and the width direction is preferably 0.5 time or more in order to produce a resin film to be used for an HUD system according to the present invention configured to inhibit coloring on a windshield from being recognized with polarized sunglasses worn. The difference in the stretch ratio is more preferably 0.8 time or more, still more preferably 1.0 time or more. In some of the cases in which the difference in the stretch ratio is less than 0.5 time, coloring is visually recognized on the projection section including the resin film, with polarized sunglasses worn, depending on the angle of a light incident on the face of the resin film. In addition, in a case in which the stretch ratio in the lower-ratio direction is less than 1.5 times, the mechanical strength in the lower-ratio direction is low, and thus, the stretch ratio in the lower-ratio direction is preferably at least 1.5 times or more, more preferably 2.0 times or more. The stretching temperature is preferably between the following: a glass transition temperature of two kinds of resins constituting a uniaxially stretched film to be stretched; and the glass transition temperature+100° C.

The film thus biaxially stretched is preferably heat-treated in the tenter in the range between the following temperatures: the stretching temperature in the width direction+100° C. and the stretching temperature in the width direction+150° C. When this is done, it is preferable that additional stretching is performed in the width direction at a stretching rate of 5 to 20%/second in the first half of the heat treatment, and that a relaxation treatment is performed in the width direction at a relaxing rate of 0.01 to 1%/second in the second half of the heat treatment. The stretch ratio for the additional stretching in the width direction is preferably 1.05 to 1.20 times. The ratio of relaxation is preferably 0.90 time to 0.99 time with respect to the width of the film immediately before relaxation. The resin film thus obtained is then uniformly and slowly cooled to room temperature. Then, the edge portions held with clips at both ends in the tenter are cut, and the resin film is wound up. In this manner, a resin film suitable for an HUD system according to the present invention can be obtained.

It is preferable for an HUD system according to the present invention that average transmittance are both 80% or more, as follows: one is the average transmittance of a light made incident normally on the resin film in the wavelength range of from 450 to 650 nm, the light being to result in a p-polarized light with respect to an incidence plane; and the other is the average transmittance of a light made incident normally on the resin film in the wavelength range of from 450 to 650 nm, the light being to result in an s-polarized light with respect to the incidence plane.

In a case in which the p-polarized light and the s-polarized light in the wavelength range of from 450 to 650 nm each have a transmittance of 80% or more, and in which an HUD system according to the present invention is incorporated in part of a windshield in a transportation machine, information of outside light, such as a sight, can be visually recognized clearly. From the above-mentioned viewpoint, the transmittance is more preferably 85% or more. The transmittance of 85% or more enhances the transparency, thus making it possible to visually recognize information of outside light more clearly.

Examples of a method of obtaining such a resin film include: a method in which preferable components are used as the components of the resin constituting the resin film; a method in which the structure of the resin film is a preferable multilayer structure; a method in which the stretching conditions, such as a stretching method, a stretching rate, a stretch ratio, and a stretching temperature, are brought within preferable ranges when a resin film is produced through stretching processes; and the like. More specifically, the resin film preferably contains an amorphous component as a constituent thereof. In a case in which sequential biaxial stretching is used as the stretching method, the stretching rate and the stretch ratio are preferably decreased to the extent that the planarity is not degraded. It is preferable that the stretching temperature is higher than the average glass transition temperature of two kinds of resin layers to be used, and in addition, is as high as possible to the extent that such a temperature does not impair the film conveyance and the film planarity.

It is preferable for a resin film to be used for an HUD system according to the present invention that the amount of change in the average transmittance in the wavelength range of from 450 to 650 nm is 10% or less when the resin film is treated at 100° C. for 250 hours. Here, "the amount of change in the average transmittance in the wavelength range of from 450 to 650 nm when treated at 100° C. for 250 hours" refers to a difference between the following: the average of the transmittance values in the wavelength range of from 450 nm to 650 nm in the case in which a p-polarized light is radiated at an incident angle of 70° to at least one face of the resin film, the p-polarized light being with respect to an incidence plane with the resin film assumed as a reflective plane; and the average of the transmittance values in the wavelength range of from 450 nm to 650 nm in the case in which a p-polarized light is radiated at an incident angle of 70° to the same position in the same face after the same resin film is left to stand under an atmosphere of 100° C. for 250 hours.

That this amount of change in the average transmittance is 10% or less means that the change caused in the optical characteristics of the resin film by heat is reduced to a low level. Using such a resin film for an HUD system makes it possible to alleviate a decrease in the performance of the HUD system display even during long-term use. From the above-mentioned viewpoint, this amount of change in the average transmittance is more preferably 5.0% or less, still more preferably 2.0% or less. In this regard, the smaller this amount of change in the average transmittance, the more preferable. Thus, the lower limit is subject to no limitation, and the lower limit is 0.1% from the viewpoint of feasibility.

Examples of a method of allowing the amount of change in the average transmittance in the wavelength range of from 450 to 650 nm to be 10% or less or within the above-mentioned preferable range when the resin film is treated at 100° C. for 250 hours include a method in which at least one of the thermoplastic resins constituting the resin film is a polyester resin containing an aromatic dicarboxylic acid unit, an aromatic diol unit, and an alkylene glycol unit having a number-average molecular weight of 200 or more. All the diol units included in the polyester resin still more preferably contain a paraxylene glycol unit at 10 mol % or more and 40 mol % or less, still more preferably 25 mol % or more and 40 mol % or less. In addition, it is also preferable to contain a BPEF unit in place of a paraxylene glycol unit. In this case, the BPEF unit is preferably in an amount of 5 mol % or more and 10 mol % or less. This allows the HUD system to keep a high display performance, and simultaneously allows the resin film to have an enhanced stability under a high-temperature environment, thus making it possible to alleviate a decrease in the display performance even during long-term use.

In an HUD system according to the present invention, the internal haze of the resin film is preferably 1% or less after treatment at 150° C. for 2 hours. Allowing the internal haze of the resin film to be 1% or less after treatment at 150° C. for 2 hours enables the processability to an HUD to be enhanced when the resin film is attached to a windshield in a transportation machine by thermal processing, and also enables the light resistance to be enhanced. From the above-mentioned viewpoint, the internal haze after treatment at 150° C. for 2 hours is more preferably 0.5% or less. The lower this internal haze, the better the transparency of the windshield. Thus, the lower limit is subject to no particular limitation. The lower limit is 0.1% or less from the viewpoint of feasibility.

Examples of a method of bringing, to 1% or less or within the above-mentioned preferable range, the internal haze of the resin film after treatment at 150° C. for 2 hours include the same method as the method of bringing, to 10% or less or the above-mentioned preferable range, the amount of change in the average transmittance exhibited in the wavelength range of 450 to 650 nm when the resin film is treated at 100° C. for 250 hours. From this viewpoint, in particular, all the diol units included in a polyester resin containing an aromatic dicarboxylic acid unit, an aromatic diol unit, and an alkylene glycol unit having a number-average molecular weight of 200 or more preferably contains a paraxylene glycol unit at 25 mol % or more and 40 mol % or less.

From the viewpoint of enhancing the durability of a windshield, it is preferable that an HUD system according to the present invention has a structure in which glass is laminated on one face of the resin film via an adhesive layer (this structure is referred to as a "structure A" in some cases). In addition, an HUD system according to the present invention not only has the structure A but also can further include a supporting member other than glass. Examples of such a supporting member include resins, and include polyethylene terephthalate, polycarbonate, acryl, polyvinyl chloride, polyethylene, polypropylene, polymethylpentene and copolymers thereof, acrylonitrile/butadiene/styrene copolymers, and the like. In addition, examples of the adhesive layer include adhesive layers based on vinyl acetate resins, vinyl chloride/vinyl acetate copolymers, ethylene/vinyl acetate copolymers, polyvinyl alcohol, polyvinylbutyral, polyvinyl acetal, polyvinyl ether, nitrile rubber, styrene/butadiene rubber, natural rubber, chloroprene rubber, polyamide, epoxy resins, polyurethane, acryl resins, cellulose, polyvinyl chloride, polyacrylic acid esters, polyisobutylene, and the like.

In addition, an adhesion adjustor, plasticizer, heat stabilizer, antioxidant, ultraviolet absorber, antistatic agent, lubricant, colorant, cross-linker, and/or the like may be added to the adhesive layer. Examples of the forms of these adhesive layers before processing include a liquid form, gelatinous form, lump-like form, powdery form, film-like form, and the like. Examples of a method of solidifying the adhesive layer include solvent volatilization, moisture curing, heat curing, mixing with a curing agent, anaerobic curing, ultraviolet curing, heat-melting and cooling, pressure sensitivity, and the like. Examples of a lamination method include laminate molding, injection molding, and the like. Using heating, pressing, and the above-mentioned method of solidifying the adhesive layer results in producing an information display member. The surface of the projected image display member may further have a functional layer, such as a hard coat layer, abrasion-resistant layer, scratch-preventing layer, antireflection layer (hereinafter referred to as a "AR layer" in some cases), color-correcting layer, ultraviolet-absorbing layer, light-stabilizing layer (HALS), heat-absorbing layer, printed layer, gas barrier layer, adhesive layer, or transparent electrode layer.

In a case in which an HUD system according to the present invention has the structure A, the image projector is preferably disposed toward the side that is a face of the resin film, and is not in contact with the adhesive layer. In addition, the resin film having an AR layer on the face having no glass laminated thereon is preferable to inhibit the generation of multiple images. Here, the AR layer refers to a layer having a lower refractive index than the surface of the resin film, and is to decrease the reflectance by virtue of the effect of interference of light. Examples of a technique for forming an AR layer include: a wet method, such as roll coating, gravure coating, spin coating, or spraying; and a dry method, such as a vacuum evaporation method, sputtering method, or CVD method. Any of these may be used. A wet method is more preferable from the viewpoint of productivity.

To enhance the durability of a windshield and simultaneously obtain the effect of inhibiting the generation of noticeable multiple images, it is also preferable that an HUD system according to the present invention has a structure in which glass is laminated on both faces of the resin film via an adhesive layer (this structure is referred to as a "structure B" in some cases). In addition, an HUD system according to the present invention not only has the structure B but also can further include a supporting member other than glass. Examples of such a supporting member include resins, and include polyethylene terephthalate, polycarbonate, acryl, polyvinyl chloride, polyethylene, polypropylene, polymethylpentene and copolymers thereof, acrylonitrile/butadiene/styrene copolymers, and the like. Examples of the adhesive layer include adhesive layers based on vinyl acetate resins, vinyl chloride/vinyl acetate copolymers, ethylene/vinyl acetate copolymers, polyvinyl alcohol, polyvinylbutyral, polyvinyl acetal, polyvinyl ether, nitrile rubber, styrene/butadiene rubber, natural rubber, chloroprene rubber, polyamide, epoxy resins, polyurethane, acryl resins, cellulose, polyvinyl chloride, polyacrylic acid esters, polyisobutylene, and the like.

In addition, an adhesion adjustor, plasticizer, heat stabilizer, antioxidant, ultraviolet absorber, antistatic agent, lubricant, colorant, cross-linker, and/or the like may be added to the adhesive layer. Examples of the forms of these adhesive layers before processing include a liquid form, gelatinous form, lump-like form, powdery form, film-like form, and the like. The adhesive is more preferably a vinyl-based adhesive having a high conformability to the shape of the face of the glass, and having an excellent processability. The adhesive is still more preferably a polyvinyl acetal-based one between which and glass a difference in the refractive index is small, and which has an excellent adhesiveness. Among others, a polyvinylbutyral resin is used particularly preferably. Such an adhesive may contain an infrared absorber to afford a heat shield property to a windshield. Examples of the infrared absorber include, besides heat shield particles, phthalocyanine compounds, naphthalocyanine compounds, anthracyanine compounds, and the like. Examples of the heat shield particles as mentioned here include lanthanum-based particles, antimony-based particles, indium-based particles, tin-based particles, tungsten oxide-based particles, and the like.

In a case in which an HUD system according to the present invention has any one of the structure A and the structure B, the thickness of the glass used for the structure is preferably in the range of from 0.5 mm to 6.0 mm from the viewpoint of achieving both the lightweight properties and high strength of the windshield. From the above-mentioned viewpoint, the thickness of the glass is more preferably 1.0 mm to 5.0 mm.

In a case in which an HUD system according to the present invention has the structure A, the thickness of the adhesive layer is preferably 2 μm to 500 μm from the viewpoint of enhancing the durability of the windshield. In addition, in a case in which an HUD system according to the present invention has the structure B, the thickness of the adhesive layer is preferably 30 μm to 800 μm from the viewpoint of enhancing the durability of the windshield and obtaining a good processability.

In a case in which an HUD system according to the present invention has any one of the structure A and the structure B, and when the structure is produced, the surface of the resin film and/or the surface of the glass preferably undergoes a surface treatment, such as a corona treatment, a plasma treatment, and/or a primer treatment, to enhance the adhesive strength at the lamination interfaces. In an HUD system according to the present invention, the surface of the outermost layer in the multilayer laminate containing the resin film may have a hard coat layer in order to protect the surface. In addition, the hard coat layer may have the function of an AR layer in combination.

In a case in which an HUD system according to the present invention has the structure B, and in which the adhesive layers on both faces of the resin film are assumed as C1 and C2 respectively, the visible and infrared light transmittance T1 of the C1 and the visible and infrared light transmittance T2 of the C2 preferably satisfy T2/T1. Here, the visible and infrared light transmittance refers to an average transmittance in the wavelength range of from 400 to 1600 nm. The relationship, T2/T1, is preferable from the viewpoint that using an HUD display image projected from the adhesive layer C2 side makes it possible to obtain a finer HUD display image, and enables the projected light source to be inhibited from being heated by heat due to infrared light to store heat.

In a case in which an HUD system according to the present invention has any one of the structure A and the structure B, and in a case in which a light is made incident at an incident angle of 60° on a resin film, the light being to result in a p-polarized light with respect to an incidence plane with the resin film assumed as a reflective plane, the ratio of the p-polarized light component contained in the transmitted light is preferably 80% or more. Having 80% or more as the ratio of the p-polarized light component in the transmitted light makes it possible that the p-polarized light made incident is converted to an s-polarized light in the process of being transmitted through the resin film, that the s-polarized light converted is reflected at the interface between the member constituting the information display section and the air, and is visually recognized by a passenger, thus being inhibited from becoming multiple images. From the above-mentioned viewpoint, the ratio of the p-polarized light component in the transmitted light is more preferably 85% or more, still more preferably 90% or more.

Examples of a means of bringing the ratio of the p-polarized light component in the transmitted light within the preferable range include: a method in which preferable components are used as the components of the resin constituting the resin film; a method in which the structure of the resin film is a preferable multilayer structure; a method in which the stretching conditions, such as a stretching method, a stretching rate, a stretch ratio, and a stretching temperature, are brought within preferable ranges when the resin film is produced through stretching processes; and a method in which a resin film is collected from a roll-shaped film produced and in a predetermined width range. More specifically, the resin film is preferably constituted by two different kinds of polyester resin layers that have different main components and are alternately laminated. In particular, it is preferable that one of the two kinds of polyester resins is a crystalline polyester, and that the other is an amorphous polyester. As a stretching method, simultaneous biaxial stretching is more preferable than sequential biaxial stretching. From the viewpoint of productivity, in a case in which sequential biaxial stretching is used, the stretching rate in the longitudinal direction is preferably made lower to the extent that the planarity is not decreased. An adjustment is preferably made in such a manner that the stretch ratio in the width direction is higher than the stretch ratio in the longitudinal direction, but not too high. It is preferable that the stretching temperature is higher than the average glass transition temperature of two kinds of resins to be used, and in addition, is as high as possible to the extent that such a temperature does not impair the film conveyance and the film planarity. Furthermore, when a heat treatment is performed after the stretching, it is also preferable that additional stretching is performed in the width direction in the first half of the heat treatment, and/or that a relaxation treatment is performed in the second half of the heat treatment. The range of the width in which the film is taken is preferably nearer the center in the width direction.

To be used, an HUD system according to the present invention is mounted in a transportation machine, a building, a digital signboard, or the like. A transportation machine is a means of transportation to be driven by a passenger, such as an aircraft, a ship, an automobile, or a railway vehicle. An HUD system according to the present invention is incorporated with a windshield in a transportation machine, for example, a windscreen or the like in the case of an automobile, and used to display information necessary for the passenger on the information display section. When the HUD system is used, the positional relationship between the projected light source and the windshield is adjusted in such a manner that an image projected from the projection light source is reflected on the information display section, and reaches the field of vision of a passenger. From the viewpoint of reducing the size of the HUD system, and enhancing the visibility, the incident angle of projection is preferably in the range of from 40 to 75°, more preferably from 50 to 70°.

A resin film according to the present invention will now be described below. A resin film according to the present invention is a resin film having at least one incidence plane, wherein the maximum of the absolute value of a* and the maximum of the absolute value of b* determined by the following measurement method satisfy the following formulae (1) and (2). A resin film according to the present invention is mounted in an HUD system, thereby making it less possible that coloring is visually recognized on a windshield even with polarized sunglasses worn. A means of obtaining a film according to the present invention is as above-mentioned.

$$\text{Maximum of absolute value of } a^* \leq 30 \tag{1}$$

$$\text{Maximum of absolute value of } b^* \leq 30 \tag{2}$$

<Measurement Method>

To a spectrophotometer (U-4100 Spectrophotometer) manufactured by Hitachi, Ltd., a variable-angle unit accessory thereto and a polarizer manufactured by Glan-Taylor are attached. A polarized light is radiated at an incident angle of each of 40°, 60°, and 80° to the film, the polarized light being to result in an s-polarized light with respect to an incidence plane with the resin film assumed as a reflective plane. Furthermore, a light transmitted through the resin film is transmitted through the polarizer the absorption axis of which is the s-polarized light. The transmittance in the wavelength range of from 400 to 1600 nm is measured at each incident angle. Here, the slit is set at 2 nm (visible)/automatically controlled (infrared), the gain is set at 2, and the scanning rate is set at 600 nm/minute. The transmittance spectrum obtained, the spectral distribution of the D65 light source, and the color matching function of the XYZ system are used to calculate the absolute value of a* and the maximum value thereof and the absolute value of b* and the maximum value thereof at each incident angle.

In this regard, the incidence plane which satisfies the above-mentioned formula (1) and formula (2) can be examined by making the same measurement with the resin film rotated about the point at which the light reaches the film.

In addition, when a transmittance in the transmittance spectrum determined by the measurement method is a transmittance measured at an incident angle θ, the smallest value of N(40), N(60), and N(80) is preferably 4 or more in the transmittance spectrum measured at the incident angle θ, assuming that a transmittance at a wavelength of A nm in the wavelength range of from 450 nm to 750 nm is T(θ,λ) (%), that the average of transmittance values in the range is C(θ) (%), and that the number of the As that satisfy T(θ,λ)=C(θ) in the range is N(θ). In addition, it is also preferable that the N(40), N(60), and N(80) satisfy the relationship, N (40)≤N (60)≤N(80). A means of obtaining a resin film in such an aspect is as above-mentioned.

In addition, the resin film preferably achieves an average reflectance of 10% or more when a light is radiated at an incident angle of 60° to the resin film, the light being to result in a p-polarized light with respect to an incidence plane with the face of the resin film assumed as a reflective plane, and simultaneously, the face of the film is rotated in the range of from 0 to 90° about the point irradiated. A means of obtaining a resin film in such an aspect is as above-mentioned.

It is preferable for a resin film in the present invention that the amount of change in the average transmittance in the wavelength range of from 450 to 650 nm is 10% or less when the resin film is treated at 100° C. for 250 hours, and that the internal haze is 1% or less after the resin film is treated at 150° C. for 2 hours. A means of obtaining a resin film in such an aspect is as above-mentioned.

EXAMPLES

An HUD system according to the present invention will now be described with reference to Examples. However, the HUD system according to the present invention is not limited to the following aspects.

[Method of Measuring Properties and Method of Evaluating Effects]

A method of evaluating the values of properties and a method of evaluating the effects are as below-mentioned.

(1) Orientation Axis

A retardation measuring device (KOBRA-21ADH) manufactured by Oji Scientific Instruments Co., Ltd. was used. A film sample cut out into a size, 3.5 cm×3.5 cm, was placed in the apparatus, and the azimuth of the orientation axis in the plane of the film was measured at an incident angle of 0°.

(2) a* Value and b* Value

To a spectrophotometer (U-4100 Spectrophotometer) manufactured by Hitachi, Ltd., a variable-angle unit accessory thereto and a polarizer manufactured by Glan-Taylor were attached. A polarized light was radiated at an incident angle of 40° to a resin film, the polarized light being to result in an s-polarized light with respect to an incidence plane, assuming that the surface of the resin film as a measuring specimen was a reflective plane. Furthermore, the light transmitted through the resin film was transmitted through the polarizer the absorption axis of which was the s-polarized light. The transmittance in the wavelength range of from 400 to 1600 nm was measured. The measurement conditions were as follows: the slit was set at 2 nm (visible)/automatically controlled (infrared); the gain was set at 2; and the scanning rate was set at 600 nm/minute. The transmittance obtained, the spectral distribution of the D65 light source, and the color matching function of the XYZ system were used to calculate the a* value and the b* value. At the incident angles of 60° and 80°, the respective a* values and b* values were calculated by the same operation as above-mentioned except that the angles were such.

(3) N(θ)

To a spectrophotometer (U-4100 Spectrophotometer) manufactured by Hitachi, Ltd., a variable-angle unit accessory thereto and a polarizer manufactured by Glan-Taylor were attached. A polarized light was radiated at an incident angle of 40° to a resin film, the polarized light being to result in an s-polarized light with respect to an incidence plane, assuming that the surface of the resin film as a measuring specimen was a reflective plane. Furthermore, the light transmitted through the resin film was transmitted through the polarizer the absorption axis of which was the s-polarized light. The transmittance T(λ) at a wavelength λ in the range of from 450 to 1600 nm was measured. The measurement conditions were as follows: the slit was set at 2 nm (visible)/automatically controlled (infrared); the gain was set at 2; and the scanning rate was set at 600 nm/minute. The polarizer was attached immediately before the detector, and only the s-polarized light component of the transmitted light was allowed to enter the detector. Assuming that the average transmittance at the wavelengths λ=450 nm to 650 nm among the transmittances obtained was C(40), the number of intersections between the transmittance spectrum at the wavelengths 2=450 nm to 650 nm and the straight line, T (40, λ)=C(40), was regarded as N(40). At the incident angles of 60° and 80°, the respective N (60) values and N (80) values were calculated by the same operation as above-mentioned except that the angles were such.

(4) Average Reflectance and Transmittance

To a spectrophotometer (U-4100 Spectrophotometer) manufactured by Hitachi, Ltd., a variable-angle unit accessory thereto and a polarizer manufactured by Glan-Taylor were attached. A light was made incident at an incident angle of each of 20°, 40°, and 70° on the face of the resin film as a measuring specimen. The reflectance of the light in the wavelength range from 400 to 1600 nm was determined, the light being to result in a p-polarized light with respect to the incidence plane with the face of the film assumed as a reflective plane. In addition, at an incident angle of 0°, the transmittance of each of a light (the term "p-polarized light" is used for convenience) the polarizing axis of which was the same as of the p-polarized light and a light (the term "s-polarized light" is used for convenience) the polarizing axis of which was perpendicular to the former polarizing axis was measured in the wavelength range of from 400 to 1600 nm. The average reflectance and the average transmittance in the wavelength range of from 450 nm to 650 nm were each determined. The measurement conditions were as follows: the slit was set at 2 nm (visible)/automatically controlled (infrared); the gain was set at 2; and the scanning rate was set at 600 nm/minute.

(5) Average Reflectance on Resin Film Rotated in In-plane Manner

The average reflectance was determined in accordance with the following procedures (a1) to (a4).

(a1) In accordance with the same procedures and measurement conditions as in (4), the reflection spectrum of a p-polarized light in the wavelength range of from 400 to 1600 nm was measured at an incident angle of 60° on the face of the resin film disposed as a measuring specimen in such a manner that the incidence plane and the orientation axis were in parallel.

(a2) From the reflection spectrum obtained in the (a1), the average of the reflectance values in the wavelength range of from 450 to 650 nm was calculated.

(a3) With the resin film rotated clockwise in an in-plane manner at 5°-intervals, the (a1) and the (a2) were repeated at each rotation angle, and the measurement was terminated when the rotation angle in total reached 90°.

(a4) The average values of the reflectance values obtained at the respective rotation angles in the (a1) to the (a3) were added up and averaged. The resulting value was regarded as an average reflectance (%) obtained when the resin film was rotated in an in-plane manner.

(6) Amount of Change in Average Transmittance in Wavelength Range of from 450 to 650 nm An average transmittance was determined in the same manner as in the evaluation method (5) except that the resin film was left to stand in an atmosphere of 25° C. for 250 hours, and then, light was made incident at an incident angle of 70° on the face of the film, the light being to result in a p-polarized light with respect to an incidence plane with the face of the resin film assumed as a reflective plane. Subsequently, the resin film was left to stand in an atmosphere of 100° C. for 250 hours. A light was made incident at an incident angle of 70° on the same position of measurement on the same face of the film as when the average transmittance was measured after the film was left to stand in an atmosphere of 25° C. for 250 hours, the light being to result in a p-polarized light with respect to the incidence plane with the face of the film assumed as the reflection plane. An average transmittance was determined in the same manner as in the evaluation method (4). From these values, a difference between both was determined, and the resulting value was regarded as the amount of change in the average transmittance in the wavelength range of from 450 to 650 nm.

(7) Internal Haze after Treatment at 150° C. for 2 Hours

A resin film was left to stand in an atmosphere of 150° C. for 2 hours, and then, placed in a quartz cell for liquid measurement. The quartz cell was then packed with liquid paraffin. A haze meter (HGM-2DP) manufactured by Suga Test Instruments Co., Ltd. was used to make a measurement, whereby the internal haze with the film surface haze removed was measured. The measurement was repeated 10 times with the measurement position changed randomly. The average of the values obtained was regarded as the internal haze value of the film.

(8) Ratio of P-polarized Light Component in Transmitted Light

The average transmittance was determined in accordance with the following procedures (b1) to (b3).

(b1) To a spectrophotometer (U-4100 Spectrophotometer) manufactured by Hitachi, Ltd., a variable-angle unit accessory thereto and a polarizer manufactured by Glan-Taylor were attached. A polarized light was made incident at an incident angle of 60° on a resin film, the polarized light being to result in a p-polarized light with respect to an incidence plane, assuming that the surface of the resin film as a measuring specimen was a reflective plane. The transmittance spectrum in the wavelength range of from 450 to 1600 nm was measured. The measurement conditions were as follows: the slit was set at 2 nm (visible)/automatically controlled (infrared); the gain was set at 2; and the scanning rate was set at 600 nm/minute. The polarizer was attached immediately before the detector, and only the p-polarized light component of the transmitted light was allowed to enter the detector. From the transmittance spectrum obtained, the average of the transmittance values in the wavelength range of from 450 to 650 nm was calculated, and regarded as Tpp, the amount of the p-polarized light component in the transmitted light.

(b2) The same experiment as in the (c1) was performed except that the light to be made incident on the detector was changed to an s-polarized light component. Thereby, Tps, the amount of the s-polarized light component in the transmitted light, was determined.

(b3) The ratio (%) of the p-polarized light component was calculated in accordance with the following equation 1.

$$\text{Ratio (\%) of }p\text{-polarized light component in transmitted light} = Tpp/(Tpp+Tps) \times 100 \qquad \text{Equation 1}$$

(9) Information Display Capability

A display (SP-133 CM) manufactured by DreamMaker Co., Ltd. was used as an image projector. A polarizer was mounted in the display. An image was projected with a light at an incident angle of 60° onto the resin film or multilayer laminate (the information display section) illustrated in Examples and Comparative Examples, the light being to result in a p-polarized light or an s-polarized light with the resin film or multilayer laminate assumed as a reflective plane. The sharpness of the displayed image and the presence or absence of the unevenness of luminance were evaluated by visual observation. The evaluation criterion is as follows.

⊚: The displayed image projected on the information display section has a high sharpness and no unevenness of luminance, and is not problematic for use.

○: The displayed image projected on the information display section has a slight unevenness of luminance, but has a high sharpness, and is not problematic for use.

x: The displayed image projected on the information display section has a poor sharpness or a strong unevenness of luminance, and is problematic for use.

(10) Visibility of Coloring

In the outdoors where the weather was fine and clear, the resin film or multilayer laminate obtained in each of Examples and Comparative Examples was slanted at 60° to the vertical direction. With polarized sunglasses worn, the center of the resin film or multilayer laminate was seen horizontally from a position 300 mm apart. In this manner, the visibility of the coloring was evaluated. The evaluation criterion is as follows.

⊚: Almost no coloring is seen.

○: Very slight coloring is seen, but not problematic for use.

x: Strong coloring is seen.

[Resin Used to Obtain Resin Film]

Resins listed in Table 1 were used to obtain a resin film to be used in each Example and each Comparative Example. In this regard, the resin 1 was a crystalline resin, and the resins 2 to 10 were amorphous resins. In addition, "mol %" represents a ratio on the assumption that the total amount of the dicarboxylic acid units and the total amount of the diol units are each 100 mol %.

TABLE 1

| Constituent Unit of Resin | | Unit | Resin 1 | Resin 2 | Resin 3 | Resin 4 | Resin 5 | Resin 6 | Resin 7 | Resin 8 | Resin 9 | Resin 10 |
|---|---|---|---|---|---|---|---|---|---|---|---|---|
| Dicarboxylic Acid Unit | Terephthalic Acid | mol % | 100 | — | — | — | — | — | — | — | 88 | — |
| | 2,6-Naphthalenedicarboxylic Acid | mol % | — | 80 | 100 | 100 | 100 | 100 | 100 | 100 | — | 70 |
| | Isophthalic Acid | mol % | — | 20 | — | — | — | — | — | — | 12 | 30 |
| Diol Unit | Ethylene Glycol | mol % | 100 | 96 | 66 | 71 | 76 | 86 | 83 | 89 | 100 | 96 |
| | Polyethylene Glycol (Molecular Weight, 400) | mol % | — | 4 | 4 | 4 | 4 | 4 | 7 | 6 | — | 4 |
| | Paraxylene Glycol | mol % | — | — | 30 | 25 | 20 | 10 | — | — | — | — |
| | BPEF | mol % | — | — | — | — | — | — | 10 | 5 | — | — |
| Intrinsic Viscosity | | — | 0.65 | 0.65 | 0.65 | 0.65 | 0.65 | 0.65 | 0.65 | 0.65 | 0.62 | 0.67 |

[Resin Film]
Resin films A and Q:

As a thermoplastic resin A, a polyethylene terephthalate (resin 1) with Intrinsic Viscosity=0.65 was used. In addition, as a thermoplastic resin B, a copolymer of polyethylene naphthalate (a polyethylene naphthalate obtained by copolymerizing: a 2,6-naphthalene dicarboxylic acid component at 80 mol % in the whole acid components; an isophthalic acid component at 20 mol % in the whole acid components; and a polyethylene glycol having a molecular weight of 400, at 4 mol % in the whole diol component; Intrinsic Viscosity=0.65) (a resin 2) was used. The thermoplastic resin A and the thermoplastic resin B that were made ready for use were fed separately into two single-screw extruders, and melted at a temperature of 290° C. Then, the thermoplastic resin A and the thermoplastic resin B were separately allowed to go through the respective 5 leaf disk filters of an FSS type, and then merged together in a multi-layer laminating apparatus having 801 slits while metered with a gear pump, in such a manner that the ratio by weight of the thermoplastic resin A to the thermoplastic resin B was 1. A molten resin multilayer laminate was thus obtained, in which 801 layers were laminated alternately in the thick direction in such a manner that the thermoplastic resin A was arranged as each outermost layer of both sides. Then, the molten resin multilayer laminate was discharged through a mouth piece, cooled on a casting drum at a temperature of 25° C., and thus solidified to obtain a cast film. The cast film obtained was heated with a group of rolls set at a temperature of 60° C., then stretched 3.0 times in the longitudinal direction of the film with rolls set at a temperature of 85° C. at a stretching rate of 50%/second, and then once cooled. The uniaxially stretched film thus obtained was introduced into a tenter, preheated with hot air at a temperature of 90° C., and then stretched 4.0 times in the width direction of the film at a temperature of 95° C. at a stretching rate of 5%/second. The film stretched was directly heat-treated with hot air at 215° C. in the tenter, subsequently relaxed 1% in the width direction under the same temperature conditions, and then cooled to room temperature. Subsequently, the edge portions at both ends in the width direction were equally cut and removed to obtain a roll of resin film having a thickness of 75 μm and a width of 400 mm. The center position, 100 mm×100 mm, in the width direction of the film was taken to obtain a resin film A having a thickness of 75 μm. In addition, a portion, 100 mm×100 mm, was taken from an end in the width direction of the roll in the same manner to obtain a resin film Q having a thickness of 75 μm.

Resin films B to P

Resin films B to P were obtained in the same manner as the resin film A except that the number of layers, the resin of each layer, the stretch ratio, and the thickness were as mentioned in Table 2. In this regard, the thickness was adjusted by regulating the rotational speed of the casting drum. In this regard, the resin film F and the resin film G were formed with the same resin supplied into the two single-screw extruders.

TABLE 2-1

| Resin Film | Unit | Resin Film | | | | | | | | |
|---|---|---|---|---|---|---|---|---|---|---|
| | | A | B | C | D | E | F | G | H | I |
| Resin of Each Thermoplastic Resin A | — | Resin 1 | Resin 1 | Resin 1 | Resin 1 | Resin 1 | Resin 1 | Resin 1 | Resin 1 | Resin 1 |
| Layer  Thermoplastic Resin B | — | Resin 2 | Resin 2 | Resin 2 | Resin 2 | Resin 2 | — | — | Resin 3 | Resin 4 |
| Number of Layers | — | 801 | 801 | 801 | 801 | 801 | 1 | 1 | 801 | 801 |
| Ratio by Weight of Thermoplastic Resin A to Thermoplastic Resin B | — | 1 | 1 | 1 | 1 | 1 | — | — | 1 | 1 |
| Stretch Ratio  Longitudinal Direction | times | 3.0 | 3.0 | 3.0 | 3.1 | 3.2 | 3.1 | 3.0 | 3.0 | 3.0 |
|  Width Direction | times | 4.0 | 3.7 | 3.3 | 3.3 | 3.3 | 3.3 | 4.0 | 4.0 | 4.0 |
| Sampling Position in Width Direction | — | Center | Center | Center | Center | Center | Center | Center | Center | Center |
| Thickness | μm | 75 | 75 | 75 | 75 | 75 | 100 | 85 | 75 | 75 |

TABLE 2-2

| Resin Film | Unit | Resin Film | | | | | | | |
|---|---|---|---|---|---|---|---|---|---|
| | | J | K | L | M | N | O | P | Q |
| Resin of Each Thermoplastic Resin A | — | Resin 1 | Resin 1 | Resin 1 | Resin 1 | Resin 1 | Resin 1 | Resin 1 | Resin 1 |
| Layer  Thermoplastic Resin B | — | Resin 5 | Resin 6 | Resin 7 | Resin 8 | Resin 2 | Resin 9 | Resin 10 | Resin 2 |
| Number of Layers | — | 801 | 801 | 801 | 801 | 801 | 801 | 801 | 801 |
| Ratio by Weight of Thermoplastic Resin A to Thermoplastic Resin B | — | 1 | 1 | 1 | 1 | 3 | 1 | 1 | 1 |
| Stretch Ratio  Longitudinal Direction | times | 3.0 | 3.0 | 3.0 | 3.0 | 3.0 | 3.0 | 3.0 | 3.0 |
|  Width Direction | times | 4.0 | 4.0 | 4.0 | 4.0 | 4.0 | 4.0 | 4.0 | 4.0 |
| Sampling Position in Width Direction | — | Center | Center | Center | Center | Center | Center | Center | End |
| Thickness | μm | 75 | 75 | 75 | 75 | 75 | 75 | 75 | 75 |

Example 1

An HUD system was produced, including: a projection light source configured to project a light that was to result in a p-polarized light with respect to an incidence plane with the resin film A assumed as a reflective plane; and the resin film A, in which the HUD system was disposed in the direction normal to the direction of the higher-ratio stretching of the resin film A and to the incidence plane of the light from the light source. The results of evaluation are tabulated in Table 3.

Example 2

To one face of the resin film A, a glass plate having a thickness of 2 mm was bonded via an acryl-based adhesive to obtain a multilayer laminate having the below-mentioned structure. An HUD system was produced, including a projection light source configured to generate a p-polarized light and radiate the light, in which the HUD system was disposed in such a manner that the direction of the higher-ratio stretching of the resin film A contained in the multilayer laminate obtained was normal to the incidence plane. The results of evaluation are tabulated in Table 3. Structure: resin film/adhesive layer (10 μm in thickness)/glass (2 mm in thickness)

Example 3

To both faces of the resin film A, a glass plate having a thickness of 2 mm was bonded via a polyvinylbutyral resin A having no heat shield property (an adhesive layer) to obtain a multilayer laminate having the below-mentioned structure. An HUD system was produced, including a projection light source configured to generate a p-polarized light and radiate the light, in which the HUD system is disposed in such a manner that the direction of the higher-ratio stretching of the resin film A contained in the multilayer laminate obtained was normal to the incidence plane. The results of evaluation are tabulated in Table 3.
Structure: glass (2 mm in thickness)/adhesive layer (350 μm in thickness)/resin film/adhesive layer (350 μm in thickness)/glass (2 mm in thickness)

Examples 4 to 16 and 21 and Comparative Examples 1 to 3

An HUD system was produced in the same manner as in Example 2 except that the resin film, the projection light source, and the relationship between the direction of the higher-ratio stretching and the incidence plane (normal/parallel) were as in Table 3. The results of evaluation are tabulated in Table 3.

Example 17

By a sputtering method, a magnesium fluoride film as an AR layer was provided on the face of the resin film of the multilayer laminate in Example 2, on which face, glass was not laminated, to obtain a multilayer laminate having the below-mentioned structure. An HUD system was produced, including the multilayer laminate obtained and a projection light source configured to generate a p-polarized light and radiate the light. The results of evaluation are tabulated in Table 3. In this regard, in the evaluation of the effects, the light source was placed on the AR layer side of the following structure.
Structure: AR layer (0.1 μm in thickness)/resin film (75 μm in thickness)/adhesive layer (10 μm in thickness)/glass (2 mm in thickness)

Example 18

A glass plate having a thickness of 2 mm was bonded to both faces of the resin film A via a polyvinylbutyral resin B (adhesive layer) containing cesium-doped tungsten oxide particles at 0.035 wt % and tin-doped indium oxide particles at 0.14 wt % and having a heat shield property to obtain a multilayer laminate having the below-mentioned structure. An HUD system was produced, including the multilayer laminate obtained and a projection light source configured to generate a p-polarized light and radiate the light. The results of evaluation are tabulated in Table 3.
Structure: glass (2 mm in thickness)/adhesive layer (350 μm in thickness)/resin film (75 μm in thickness)/adhesive layer (350 μm in thickness)/glass (2 mm in thickness)

Example 19

A glass plate having a thickness of 2 mm was bonded to one face of the resin film A via a polyvinylbutyral resin A (adhesive layer) in Example 3 and to the other face via a polyvinylbutyral resin B (adhesive layer) in Example 18 to obtain a multilayer laminate having the below-mentioned structure. An HUD system was produced, including the multilayer laminate obtained and a projection light source configured to generate a p-polarized light and radiate the light. The results of evaluation are tabulated in Table 3. In this regard, in the evaluation of the effects, the light source was placed on the glass side in contact with the polyvinylbutyral A side.
Structure: glass (2 mm in thickness)/adhesive layer (350 μm in thickness)/resin film (75 μm in thickness)/adhesive layer (350 μm in thickness)/glass (2 mm in thickness)

TABLE 3-1

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Resin Film | A | A | A | B | C | D | E | H | I | J | K | L |
| Relationship (Normal/Parallel) between Higher-ratio Stretching Direction of Resin Film and Incidence Plane | Normal | Normal | Normal | Normal | Normal | Normal | Normal | Normal | Normal | Normal | Normal | Normal |
| Maximum Values of $a^*(\theta)$ and $b^*(\theta)$ | 9 | 9 | 9 | 13 | 20 | 23 | 25 | 9 | 8 | 8 | 8 | 9 |
| N(40) | 6 | 6 | 6 | 5 | 4 | 4 | 2 | 6 | 7 | 6 | 6 | 6 |
| N(60) | 8 | 8 | 8 | 8 | 7 | 6 | 5 | 8 | 8 | 8 | 9 | 8 |
| N(80) | 10 | 10 | 10 | 9 | 8 | 9 | 6 | 10 | 11 | 10 | 11 | 9 |
| Rp20 (%) | 21 | 21 | 21 | 19 | 20 | 20 | 20 | 22 | 21 | 20 | 20 | 19 |
| Rp40 (%) | 35 | 35 | 35 | 32 | 33 | 33 | 34 | 36 | 34 | 34 | 33 | 32 |
| Rp70 (%) | 68 | 68 | 68 | 61 | 63 | 63 | 64 | 70 | 68 | 68 | 64 | 62 |
| Average Reflectance (%) on Resin Film Rotated in In-plane Manner | 60 | 60 | 60 | 55 | 56 | 56 | 57 | 63 | 62 | 62 | 56 | 54 |
| Transmittance (%) of P-polarized Light at Incident Angle of 0° | 83 | 83 | 83 | 84 | 85 | 85 | 85 | 86 | 82 | 83 | 82 | 82 |
| Transmittance (%) of S-polarized Light at Incident Angle of 0° | 84 | 84 | 84 | 84 | 86 | 85 | 85 | 85 | 85 | 83 | 82 | 83 |

TABLE 3-1-continued

|  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|
| Amount of Change (%) in Average Transmittance after Treatment at 100° C. for 250 Hours | 22.0 | 22.0 | 22.0 | 21.0 | 23.0 | 20.0 | 19.0 | 0.1 | 0.2 | 0.5 | 2.5 | 0.1 |
| Internal Haze (%) after Treatment at 150° C. for 2 Hours | 2.0 | 2.0 | 2.0 | 1.9 | 2.1 | 1.8 | 1.9 | 0.2 | 0.9 | 1.2 | 1.8 | 1.9 |
| Structure | Film alone | A | B | A | A | A | A | A | A | A | A | A |
| AR coat | — | — | — | — | — | — | — | — | — | — | — | — |
| Heat-absorbing PVB | — | — | — | T1 = T2 = 99% | — | — | — | — | — | — | — | — |
| Ratio of P-polarized Light Component in Transmitted Light % | 94 | 94 | 94 | 93 | 92 | 90 | 87 | 95 | 94 | 94 | 94 | 94 |
| Visibility of Coloring | ⊙ | ⊙ | ⊙ | ⊙ | ⊙ | ○ | ○ | ⊙ | ⊙ | ⊙ | ⊙ | ⊙ |
| Polarization of Light Radiated in Evaluation of Information Display | p | p | p | p | p | p | p | p | p | p | p | p |
| Information Display Capability | ⊙ | ⊙ | ⊙ | ○ | ○ | ○ | ○ | ⊙ | ○ | ○ | ○ | ○ |

TABLE 3-2

|  | Example 13 | Example 14 | Example 15 | Example 16 | Example 17 | Example 18 | Example 19 | Example 20 | Example 21 | Comparative Example 1 | Comparative Example 2 | Comparative Example 3 |
|---|---|---|---|---|---|---|---|---|---|---|---|---|
| Resin Film | M | N | O | P | A | A | A | Q | G | F | A | A |
| Relationship (Normal/Parallel) between Higher-ratio Stretching Direction of Resin Film and Incidence Plane | Normal | Normal | Normal | Normal | Normal | Normal | Normal | Normal | Normal | Normal | Normal | Normal |
| Maximum Values of $a^*(\theta)$ and $b^*(\theta)$ | 9 | 10 | 9 | 12 | 9 | 9 | 9 | 29 | 14 | 85 | 9 | 38 |
| N(40) | 7 | 6 | 6 | 6 | 6 | 6 | 6 | 4 | 5 | 1 | 6 | 3 |
| N(60) | 9 | 8 | 9 | 8 | 8 | 8 | 8 | 6 | 7 | 3 | 8 | 2 |
| N(80) | 11 | 10 | 11 | 9 | 10 | 10 | 10 | 8 | 8 | 4 | 10 | 3 |
| Rp20 (%) | 19 | 16 | 5 | 22 | 21 | 21 | 21 | 21 | 6 | 6 | 21 | 21 |
| Rp40 (%) | 31 | 26 | 9 | 37 | 35 | 35 | 35 | 34 | 3 | 3 | 35 | 35 |
| Rp70 (%) | 61 | 50 | 21 | 70 | 68 | 68 | 68 | 65 | 12 | 12 | 68 | 68 |
| Average Reflectance (%) on Resin Film Rotated in In-plane Manner | 53 | 44 | 15 | 62 | 60 | 60 | 60 | 58 | 2 | 2 | 60 | 60 |
| Transmittance (%) of P-polarized Light at Incident Angle of 0° | 82 | 83 | 87 | 77 | 83 | 83 | 83 | 82 | 94 | 94 | 83 | 83 |
| Transmittance (%) of S-polarized Light at Incident Angle of 0° | 81 | 82 | 87 | 75 | 84 | 84 | 84 | 80 | 94 | 94 | 84 | 84 |
| Amount of Change (%) in Average Transmittance after Treatment at 100° C. for 250 Hours | 1.5 | 21.8 | 18.0 | 20.9 | 22.0 | 22.0 | 22.0 | 21.5 | 0.1 | 0.1 | 22.0 | 22.0 |
| Internal Haze (%) after Treatment at 150° C. for 2 Hours | 2.0 | 2.0 | 1.1 | 1.4 | 2.0 | 2.0 | 2.0 | 1.9 | 0.1 | 0.1 | 2.0 | 2.0 |
| Structure | A | A | A | A | A | B | B | A | A | A | A | A |
| AR Coat | — | — | — | — | coated | — | — | — | — | — | — | — |
| Heat-absorbing PVB | — | — | — | — | — | T1 = T2 = 99% | T1 = 40 T2 = 99 | — | — | — | — | — |
| Ratio of P-polarized Light Component in Transmitted Light % | 94 | 94 | 94 | 94 | 94 | 94 | 94 | 83 | 94 | 89 | 94 | 71 |
| Visibility of Coloring | ⊙ | ⊙ | ⊙ | ⊙ | ⊙ | ⊙ | ⊙ | ○ | ○ | × | ⊙ | × |
| Polarization of Light Radiated in Evaluation of Information Display | p | p | p | p | p | p | p | p | p | p | s | p |
| Information Display Capability | ○ | ○ | ○ | ⊙ | ⊙ | ⊙ | ⊙ | ○ | × | × | × (S Wave) | ○ |

In this regard, "the maximum value of a* (θ) and b* (θ)" in Table 3 means the largest value of |a*(40)|, |a*(60)|, |a*(80)|, |b*(40)|, |b*(60)|, and |b*(80)|.

INDUSTRIAL APPLICABILITY

The present invention makes it possible to obtain a head-up display system that maintains uniform reflective performance, and makes it less possible even for a wearer of polarized sunglasses to visually recognize an interference color, even in a case in which an image is projected in a wide range on a windshield. A head-up display system according to the present invention includes the above-mentioned characteristics, and thus, can be used suitably for transportation machines, such as an aircraft, a ship, an automobile, and a railway vehicle, a building, and a digital signboard.

REFERENCE SIGNS LIST

1: Resin Film
2: Polarizer
3: Detector
i: Incident light (s-polarized light)
t1: Transmitted light (after being transmitted through the projection section)
t2: Transmitted light (after being transmitted through the projection section and the polarizer)
θ: incident angle
$T(\theta,\lambda)$: Transmittance at a wavelength of λ nm, determined as an s-polarized light radiated at an incident angle of θ° from the light source is transmitted through the resin film and the polarizer
$C(\theta)$: Average of $T(\theta,\lambda)$ values in the wavelength range of from 450 nm to 750 nm

The invention claimed is:

1. A head-up display system comprising: an image projector configured to project an image; and a resin film configured such that said image from said image projector is projected on said resin film;
wherein, in a light constituting the image from said image projector, the intensity of a p-polarized light component with respect to an incidence plane is 51% or more of the intensity of all the light components, assuming that said resin film is a reflective plane; and
wherein said resin film is disposed in such a manner that said incidence plane where the maximum of the absolute value of a* and the maximum of the absolute value of b* determined by the following measurement method satisfy the following formulae (1) and (2) is at 90=10° to a horizontal plane;

$$\text{maximum of absolute value of } a^* \leq 30 \quad (1),$$

$$\text{maximum of absolute value of } b^* \leq 30 \quad (2);$$

<Measurement Method>
wherein, to a spectrophotometer (U-4100 Spectrophotometer) manufactured by Hitachi, Ltd., a variable-angle unit accessory thereto and a polarizer manufactured by Glan-Taylor are attached; a polarized light is radiated at an incident angle of each of 40°, 60°, and 80° to said film, said polarized light being to result in an s-polarized light with respect to an incidence plane with said resin film assumed as a reflective plane; furthermore, a light transmitted through said resin film is transmitted through said polarizer the absorption axis of which is said s-polarized light; and the transmittance in the wavelength range of from 400 to 1600 nm is measured at each incident angle; wherein, the slit is set at 2 nm (visible)/automatically controlled (infrared), the gain is set at 2, and the scanning rate is set at 600 nm/minute; wherein the transmittance spectrum obtained, the spectral distribution of the D65 light source, and the color matching function of the XYZ system are used to calculate said absolute value of a* and the maximum value thereof and said absolute value of b* and the maximum value thereof at each incident angle; and
wherein said incidence plane which satisfies the above-mentioned formula (1) and formula (2) can be examined by making the same measurement with said resin film rotated about the point at which said light reaches the film.

2. The head-up display system according to claim 1, wherein, when said transmittance in said transmittance spectrum determined by said measurement method is a transmittance measured at an incident angle θ, the smallest value of N(40), N(60), and N(80) is 4 or more in said transmittance spectrum measured at said incident angle θ, assuming that a transmittance at a wavelength of λ nm in the wavelength range of from 450 nm to 750 nm is $T(\theta,\lambda)$ (%), that the average of transmittance values in the range is $C(\theta)$ (%), and that the number of the λs that satisfy $T(\theta,\lambda)=C(\theta)$ in the range is $N(\theta)$.

3. The head-up display system according to claim 2, wherein said N(40), N(60), and N(80) satisfy the relationship N (40)≤N(60)≤N(80).

4. The head-up display system according to claim 1, wherein said resin film satisfies the relationship, Rp20≤Rp40<Rp70, assuming that the reflectance (%) of a light made incident at an incident angle of each of 20°, 40°, and 70° on said resin film is Rp20, Rp40, and Rp70 respectively, said light being to result in a p-polarized light with respect to an incidence plane with the face of said resin film assumed as a reflective plane.

5. The head-up display system according to claim 1, wherein said resin film achieves an average reflectance of 10% or more when a light is radiated at an incident angle of 60° to said resin film, said light being to result in a p-polarized light with respect to an incidence plane with the face of said resin film assumed as a reflective plane, and simultaneously, the face of said film is rotated in an in-plane manner in the range of from 0 to 90° about the point irradiated.

6. The head-up display system according to claim 1, wherein average transmittance are both 80% or more, as follows: one is the average transmittance of a light made incident normally on said resin film in the wavelength range of from 450 to 650 nm, said light being to result in a p-polarized light with respect to an incidence plane; and the other is the average transmittance of a light made incident normally on said resin film in the wavelength range of from 450 to 650 nm, said light being to result in an s-polarized light with respect to said incidence plane.

7. The head-up display system according to claim 1, wherein, when said resin film is treated at 100° C. for 250 hours, the amount of change in the average transmittance in the wavelength range of from 450 to 650 nm is 10% or less.

8. The head-up display system according to claim 1, wherein, after the resin film is treated at 150° C. for 2 hours, the internal haze of said film is 1% or less.

9. The head-up display system according to claim 1, having a structure (structure A) in which a glass plate is laminated on one face of said resin film via an adhesive layer.

10. The head-up display system according to claim 1, having a structure (structure B) in which a glass plate is laminated on both faces of said resin film via an adhesive layer.

11. The head-up display system according to claim 9, comprising an antireflection layer on the face of the resin film, on which face no glass plate is laminated.

12. The head-up display system according to claim 10, wherein at least one of the glass plates has an antireflection layer on the face of the glass plate, the face being not on the adhesive layer.

13. The head-up display system according to claim 10, wherein, assuming that said adhesive layers on both faces of said resin film are C1 and C2 respectively, the visible and infrared light transmittance T1 of said C1 and the visible and infrared light transmittance T2 of said C2 satisfy T2+T1.

14. The head-up display system according to claim 1, wherein, when said p-polarized light is radiated at an incident angle of 60° to said resin film, a ratio of the p-polarized light component contained in the transmitted light is 80% or more.

15. A transportation machine comprising the head-up display system according to claim 1 mounted therein.

16. A resin film having at least one incidence plane, wherein the maximum of the absolute value of a* and the maximum of the absolute value of b* determined by the following measurement method satisfy the following formulae (1) and (2):

maximum of absolute value of $a^* \leq 30$     (1), maximum of absolute value of $b^* \leq 30$     (2);

<Measurement Method> wherein, to a spectrophotometer (U-4100 Spectrophotometer) manufactured by Hitachi, Ltd., a variable-angle unit accessory thereto and a polarizer manufactured by Glan-Taylor are attached; a polarized light is radiated at an incident angle of each of 40°, 60°, and 80° to said film, said polarized light being to result in an s-polarized light with respect to an incidence plane with said resin film assumed as a reflective plane; furthermore, a light transmitted through said resin film is transmitted through said polarizer the absorption axis of which is said s-polarized light; and the transmittance in the wavelength range of from 400 to 1600 nm is measured at each incident angle; wherein, the slit is set at 2 nm (visible)/automatically controlled (infrared), the gain is set at 2, and the scanning rate is set at 600 nm/minute; wherein the transmittance spectrum obtained, the spectral distribution of the D65 light source, and the color matching function of the XYZ system are used to calculate said absolute value of a* and the maximum value thereof and said absolute value of b* and the maximum value thereof at each incident angle; and wherein said incidence plane which satisfies the above-mentioned formula (1) and formula (2) can be examined by making the same measurement with said resin film rotated about the point at which said light reaches the film.

17. The resin film according to claim 16, wherein, when said transmittance in said transmittance spectrum determined by said measurement method is a transmittance measured at an incident angle θ, the smallest value of N(40), N(60), and N(80) is 4 or more in said transmittance spectrum measured at said incident angle θ, assuming that a transmittance at a wavelength of λ nm in the wavelength range of from 450 nm to 750 nm is T(θ,λ) (%), that the average of transmittance values in the range is C(θ) (%), and that the number of the λs that satisfy T(θ,Δ)=C(θ) in the range is N(θ).

18. The resin film according to claim 17, wherein said N(40), N(60), and N(80) satisfy the relationship N(40)≤N(60)≤N(80).

19. The resin film according to claim 16, wherein said resin film achieves an average reflectance of 10% or more when a light is radiated at an incident angle of 60° to said resin film, said light being to result in a p-polarized light with respect to an incidence plane with the face of said resin film assumed as a reflective plane, and simultaneously, the face of said film is rotated in the range of from 0 to 90° about the point irradiated.

20. The resin film according to claim 16, wherein, when said resin film is treated at 100° C. for 250 hours, the amount of change in the average transmittance in the wavelength range of from 450 to 650 nm is 10% or less.

21. The resin film according to claim 16, wherein, after said resin film is treated at 150° C. for 2 hours, the internal haze of said film is 1% or less.

* * * * *

UNITED STATES PATENT AND TRADEMARK OFFICE
CERTIFICATE OF CORRECTION

| | | |
|---|---|---|
| PATENT NO. | : 12,372,784 B2 | Page 1 of 1 |
| APPLICATION NO. | : 18/024077 | |
| DATED | : July 29, 2025 | |
| INVENTOR(S) | : Shin Hirose et al. | |

It is certified that error appears in the above-identified patent and that said Letters Patent is hereby corrected as shown below:

In the Claims

In Column 29, Line 50 in Claim 1, delete "90=10°" and insert -- 90±10° --.

In Column 31, Line 16 in Claim 13, delete "T2+T1" and insert -- T2 ≠ T1 --.

In Column 32, Line 24 in Claim 17, delete "T(θ,Δ)" and insert -- T(θ,λ) --.

Signed and Sealed this
Eleventh Day of November, 2025

John A. Squires
*Director of the United States Patent and Trademark Office*